(12) United States Patent
    Walker

(10) Patent No.: US 8,909,867 B2
(45) Date of Patent: Dec. 9, 2014

(54) METHOD AND APPARATUS FOR ALLOCATING INSTRUCTION AND DATA FOR A UNIFIED CACHE

(75) Inventor: William L. Walker, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 490 days.

(21) Appl. No.: 12/861,983

(22) Filed: Aug. 24, 2010

(65) Prior Publication Data

US 2012/0054442 A1    Mar. 1, 2012

(51) Int. Cl.
*G06F 13/00*    (2006.01)
*G06F 13/28*    (2006.01)
*G06F 12/08*    (2006.01)
*G06F 12/12*    (2006.01)

(52) U.S. Cl.
CPC ........ *G06F 12/0848* (2013.01); *G06F 12/0802* (2013.01); *G06F 12/126* (2013.01); *G06F 2212/601* (2013.01); *G06F 2212/604* (2013.01)
USPC ................................... 711/123; 711/E12.046

(58) Field of Classification Search
USPC .......................................... 711/123, E12.046
See application file for complete search history.

(56) References Cited

U.S. PATENT DOCUMENTS

| 6,532,520 | B1 * | 3/2003 | Dean et al. | 711/133 |
| 2005/0235134 | A1 * | 10/2005 | O'Sullivan | 712/10 |
| 2010/0077149 | A1 * | 3/2010 | Moyer | 711/128 |

OTHER PUBLICATIONS

Yanbing Li, "HML, a Novel Hardware Description Language and Its Translation to VHDL", Oct. 3, 1997.*
R. Fabian Pease, "Lithography and Other Patterning Techniques for Future Electronics", Feb. 2, 2008.*

\* cited by examiner

*Primary Examiner* — Edward Dudek, Jr.

(57) ABSTRACT

The present invention provides a method and apparatus for allocating space in a unified cache. The method may include partitioning the unified cache into a first portion of lines that only store copies of instructions retrieved from a memory and a second portion of lines that only store copies of data retrieved from the memory.

17 Claims, 5 Drawing Sheets

METHOD AND APPARATUS FOR ALLOCATING INSTRUCTION AND DATA FOR A UNIFIED CACHE

BACKGROUND OF THE INVENTION

1. Field of the Invention

This invention relates generally to processor-based systems, and, more particularly, to locating instruction and data for a unified cache.

2. Description of the Related Art

Many processing devices utilize caches to reduce the average time required to access information stored in a memory. A cache is a smaller and faster memory that stores copies of instructions and/or data that are expected to be used relatively frequently. For example, central processing units (CPUs) are generally associated with a cache or a hierarchy of cache memory elements. Instructions or data that are expected to be used by the CPU are moved from (relatively large and slow) main memory into the cache. When the CPU needs to read or write a location in the main memory, it first checks to see whether the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the latency of memory accesses below the latency of the main memory to a value close to the value of the cache memory.

One widely used architecture for a CPU cache memory divides the cache into two layers that are known as the L1 cache and the L2 cache. The L1 cache is typically a smaller and faster memory than the L2 cache, which is smaller and faster than the main memory. The CPU first attempts to locate needed memory locations in the L1 cache and then proceeds to look successively in the L2 cache and the main memory when it is unable to find the memory location in the cache. The L1 cache can be further subdivided into separate L1 caches for storing instructions (L1-I) and data (L1-D). The L1-I cache can be placed near entities that require more frequent access to instructions than data, whereas the L1-D can be placed closer to entities that require more frequent access to data than instructions. The L2 cache is associated with both the L1-I and L1-D caches and can store copies of information or data that are retrieved from the main memory. Frequently used instructions are copied from the L2 cache into the L1-I cache and frequently used data can be copied from the L2 cache into the L1-D cache. The L2 cache is therefore referred to as a unified cache.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for allocating space in a unified cache. The method may include partitioning the unified cache into a first portion of lines that only store copies of instructions retrieved from a memory and a second portion of lines that only store copies of data retrieved from the memory.

In another exemplary embodiment, an apparatus is provided that includes an instruction cache configured to store copies of instructions from a memory and a data cache configured to store copies of data from the memory. The apparatus also includes a unified cache that is communicatively coupled to the instruction cache and the data cache. The unified cache is configured to be partitioned into a first portion of lines that only store copies of instructions retrieved from a memory and a second portion of lines that only store copies of data retrieved from a memory. The apparatus further includes an allocation controller configured to determine the partitioning of the unified cache.

In yet another exemplary embodiment, a semiconductor device is provided that includes a processing element, a memory, an instruction cache configured to store copies of instructions from the memory, and a data cache configured to store copies of data from the memory. The semiconductor device also includes a unified cache that is communicatively coupled to the instruction cache and the data cache. The unified cache is configured to be partitioned into a first portion of lines that only store copies of instructions retrieved from the memory and a second portion of lines that only store copies of data retrieved from the memory.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
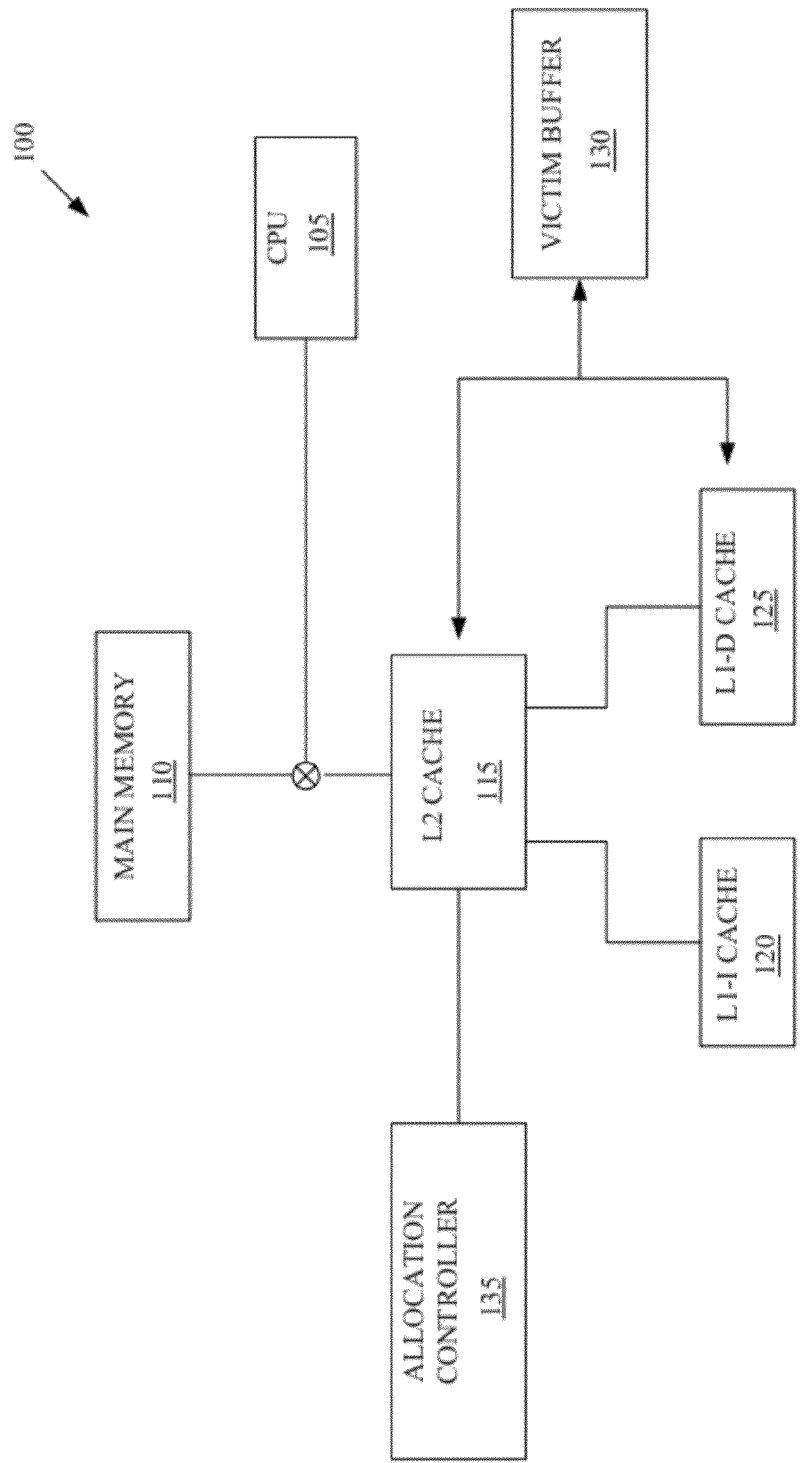
FIG. 1 conceptually illustrates one exemplary embodiment of a semiconductor device that may be formed on a semiconductor wafer.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation may be described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a semiconductor device 100 that may be formed in or on a semiconductor wafer (or die). The semiconductor device 100 may formed in or on the semiconductor wafer using well known processes such as deposition, growth, photolithography, etching, planarising, polishing, annealing, and the like. In the illustrated embodiment, the device 100 includes a processing unit (such as, for example, a central processing unit or CPU) 105 that is configured to access instructions and/or data that are stored in the main memory 110. Other types of processing units such as digital signal processors (DSPs), graphics processing units (GPUs) and others could also embody aspects of the present invention. However, for ease of understanding reference will be made to CPU 105. The CPU 105 can then perform the instructions and/or manipulate the data. The device 100 also implements a hierarchical cache system that is used to speed access to the instructions and/or data by storing selected instructions and/or data in the caches. The illustrated cache system includes a unified level 2 (L2) cache 115 for storing copies of instructions and/or data that are stored in the main memory 110. The illustrated cache system also includes separate level 1 (L1) caches for storing instructions and data, which are referred to as the L1-I cache 120 and the L1-D cache 125.

The L1 caches 120, 125 are formed using smaller and faster memory elements (relative to the main memory 110 and the L2 cache 115) so that information stored in the lines of these caches 120, 125 can be retrieved quickly by the CPU 105. Because of the low latency, the CPU 105 first checks the L1 caches 120, 125 when it needs to retrieve or access an instruction or data. If the request to the L1 caches 120, 125 misses, then the request may be directed to the unified L2 cache 115, which is formed of a relatively larger and slower memory element than the L1 caches 120, 125. The main memory 110 is formed of memory elements that are larger and slower than the unified L2 cache 115 and so the main memory 110 may be the object of a request when it receives cache misses from both the L1 caches 120, 125 and the unified L2 cache 115.

One or more victim caches or buffers 130 may also be included to temporarily store copies of information that has been evicted from one or more of the caches 115, 120, 125. For example, if an attempt to read or write an instruction or data from one of the caches 115, 120, 125 results in a cache miss and the instruction/data needs to be read from the main memory 105, one or more lines of the caches 115, 100, 125 may be evicted so that these lines can be replaced with the instruction/data that was read from the main memory 105. The evicted the data can be temporarily stored in the victim buffer 130, e.g., to reduce the number of conflict misses, which are misses that could have been avoided if the cache entry was not evicted earlier.

An allocation controller 135 is also implemented in the semiconductor device 100 to control the allocation of lines in the L2 cache 115 to instructions or data. The allocation controller 135 is depicted in FIG. 1 as being directly connected to the L2 cache 115. However, persons of ordinary skill in the art having benefit of the present disclosure should appreciate that this is intended to indicate that the allocation controller 135 is electronically and/or communicatively coupled to the L2 cache 115. In some embodiments, other elements may intervene between the allocation controller 135 and the L2 cache 115 without necessarily preventing these entities from being electronically and/or communicatively coupled as indicated. Moreover, the allocation controller 135 may also be capable of gathering information from other entities and nodes within the semiconductor device 100 and providing information to these entities and nodes (e.g., by sending and receiving signals).

The allocation controller 135 is configured to partition the unified L2 cache 115 into lines that only store copies of instructions retrieved from the main memory 110 and lines that only store copies of data retrieved from the main memory 110. In one embodiment, the entire L2 cache 115 may be divided into one portion that includes lines that only store copies of instructions and another portion that only stores copies of data. However, in alternative embodiments, a subset of the lines of the L2 cache 115 can be partitioned into instruction-only and data-only lines, while the remaining lines of the L2 cache 115 are permitted to store either instructions or data. For example, the allocation controller 135 may use a defined replacement policy to control operation of the L2 cache 115 so that instruction-only lines are replaced only with instructions retrieved from the main memory 110 and the data-only lines are replaced only with data retrieved from the main memory 110. Partitioning of the unified L2 cache 115 may be performed statically (e.g., as part of an initialization process) or dynamically in response to changing conditions during operation of the device 100, as discussed herein.

Figure 2:
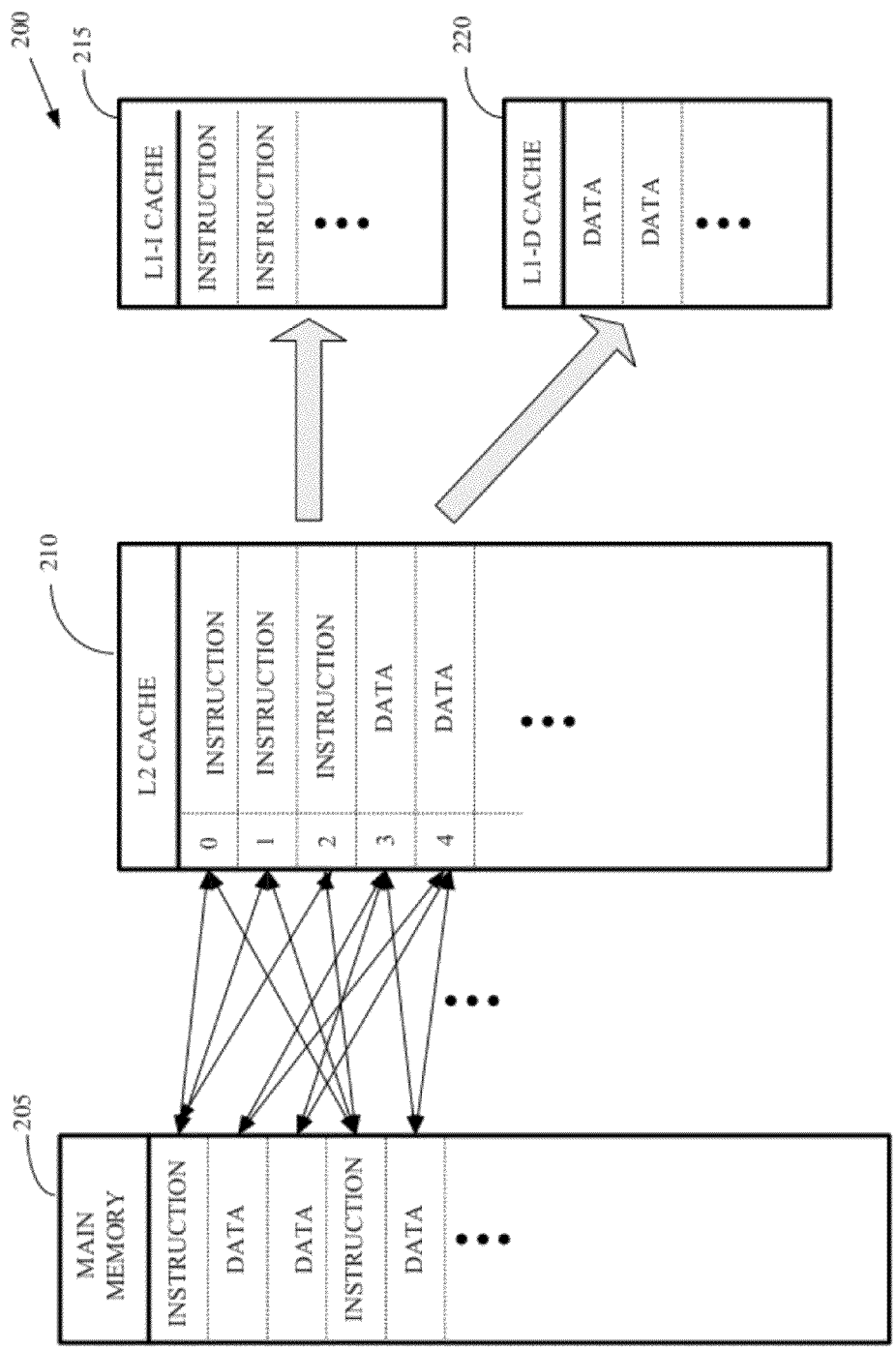
FIG. 2 conceptually illustrates one exemplary embodiment of a hierarchical cache system.

FIG. 2 conceptually illustrates one exemplary embodiment of a hierarchical cache system 200. In the illustrated embodiment, the hierarchical cache system 200 includes a main memory 205 for storing instructions and data. A unified L2 cache 210 is communicatively and/or electronically connected to the main memory 205 so that copies of these instructions and/or data can be passed between the main memory 205 and the unified L2 cache 210. In the illustrated embodiment, the L2 cache 210 is 16-way associative to the main memory 205 so that each line in the main memory 205 can potentially be copied to and from 16 particular lines (which are conventionally referred to as "ways") in the L2 cache 210. The associativity of the main memory 205 and the L2 cache 210 as indicated by the double headed arrows. However, persons of ordinary skill in the art having benefit of the present disclosure should appreciate that alternative embodiments of the main memory 205 and the L2 cache 210 can be implemented using any associativity. Relative to the main memory 205, the unified L2 cache 210 is implemented using smaller and faster memory elements.

The illustrated embodiment of the hierarchical cache system 200 also includes two L1 caches 215, 220 that are used to store instructions and data, respectively. Relative to the unified L2 cache 210, the L1 caches 215, 220 are implemented using smaller and faster memory elements. Furthermore, separating the L1 caches 215, 220 into an L1-I cache 215 for storing only instructions and an L1-D cache 220 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 215 are replaced with instructions from the unified L2 cache 210 and the lines in the L1-D cache 220 are replaced with data from the unified L2 cache 210.

The unified L2 cache 210 is partitioned so that one portion of the lines only holds instructions and another portion of the lines only holds data. In the illustrated embodiment, the unified L2 cache 210 is partitioned by allocating one portion of the ways to instructions and another portion of the ways to data. For example, FIG. 2 shows that ways 0-2 are allocated to instructions and the ways 3-4 are allocated to data. If the unified L2 cache 210 is 16-way associative, then the remaining ways 5-15 can be allocated to instructions, data, or they may not be restricted to either type of information so that they can hold instructions and data. The replacement policy for the unified L2 cache may dictate that the ways 0-2 can only be replaced with instructions that are retrieved from the main memory 205. The replacement policy may also dictate that the ways 3-4 may only be replaced with data retrieved from the main memory 205. The allocation of the instruction/data lines in the L2 cache 210 may be performed dynamically and so in some cases a line/way that is allocated to one type of information may (e.g., because of a previous allocation) contain the other type of information until that line/way is replaced.

Figure 3:
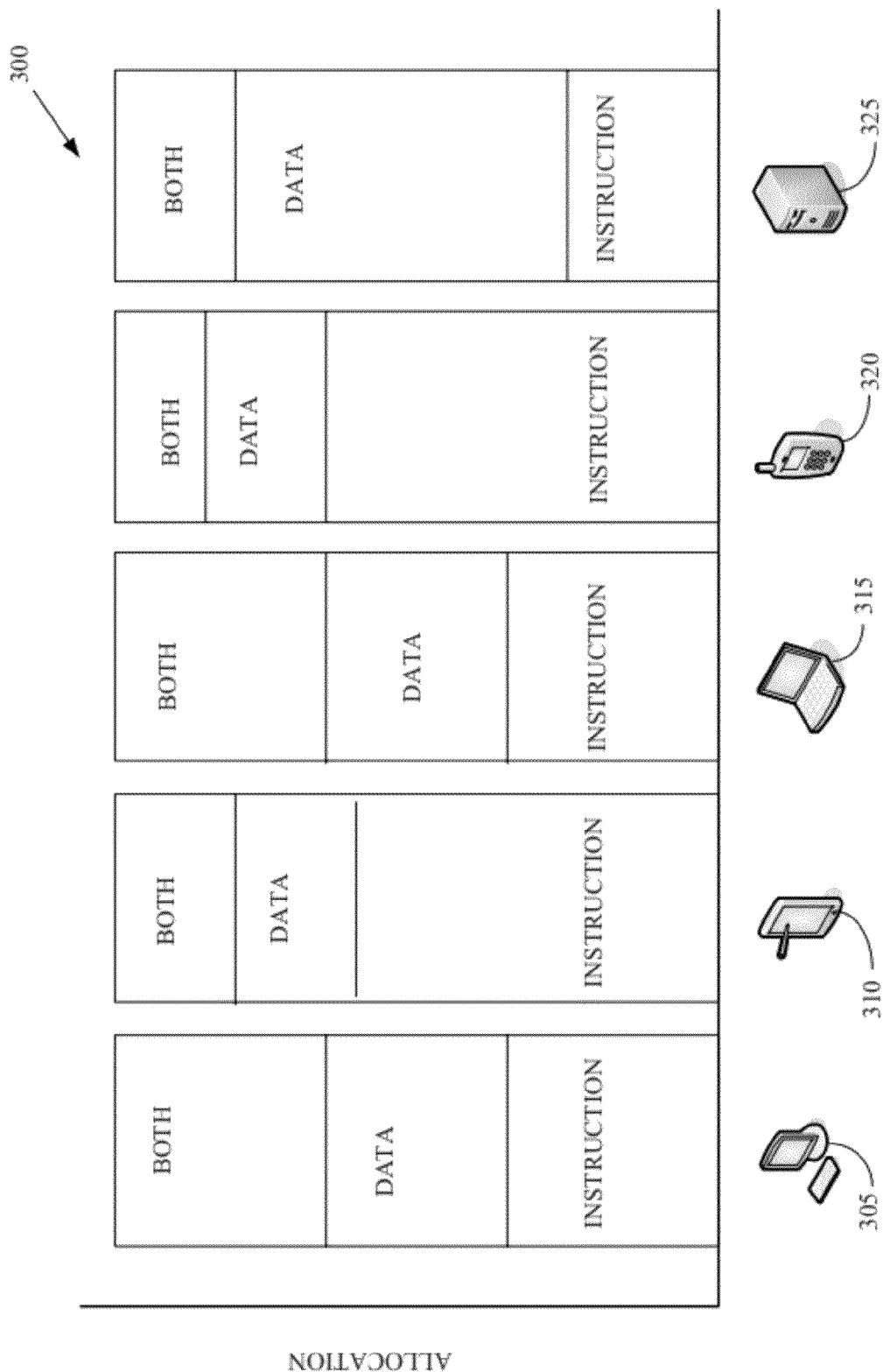
FIG. 3 conceptually illustrates exemplary allocations of a unified cache to instructions, data, or both types of information.

FIG. 3 conceptually illustrates exemplary allocations 300 of a unified cache to instructions, data, or both types of information. In the illustrated embodiment, the allocations 300 are determined based on the type of devices that implement the unified cache. For example, properties of the devices such as whether these devices are expected to generate a large number of requests for instructions or data can be used to allocate the portions of the unified cache. The allocations can be static so that the initial allocation is preserved while the devices are in operation. Alternatively, the allocations can be part of a dynamic allocation scheme, e.g., by using the allocation shown in FIG. 3 as an initial allocation that can be varied during operation of the devices in response to changing operational conditions. The exemplary devices shown in FIG. 3 are a desktop computer 305, a tablet device 310, a notebook or net book computer 315, a mobile phone 320, and a server 325. However, persons of ordinary skill in the art having benefit of the present disclosure should appreciate that the allocation depicted in FIG. 3 can be performed for any unified cache embedded in any entity. For example, unified caches may be embedded into such disparate devices as printers, fax machines, refrigerators, washing machines, automobiles, aircraft, and the like.

The desktop computer 305 may be used in many different ways depending on the needs and/or desires of the owner of the desktop computer 305. Accordingly, approximately equal portions of the unified cache can be allocated for instruction-only lines, data-only lines, and lines that are available to receive both instructions and data. The tablet device 310 may be expected to support numerous programs that may operate on a relatively limited supply of data. In that case, a unified cache in the tablet device 310 may be partitioned into a relatively large number of instruction-only lines and smaller numbers of data-only lines and lines that can receive both types of information. A notebook computer 315 may be used in many different ways depending on the needs and/or desires of the owner of the desktop computer 305. Accordingly, approximately equal portions of its unified cache can be allocated for instruction-only lines, data-only lines, and lines that are available to receive both instructions and data. The mobile device 320 may be expected to support numerous apps that may be expected to provide real-time response while operating on a relatively limited supply of data. In that case, a unified cache in the mobile device 320 may be partitioned into a relatively large number of instruction-only lines and smaller numbers of data-only lines and lines that can receive both types of information. The server 325 may be used as a repository for databases that are frequently accessed using a limited number of well defined queries. A unified cache in the server 325 may therefore be partitioned into a relatively small number of instruction-only lines and lines that are allocated to both instructions and data, while reserving a relatively large number of lines for receiving only data.

Figure 4:
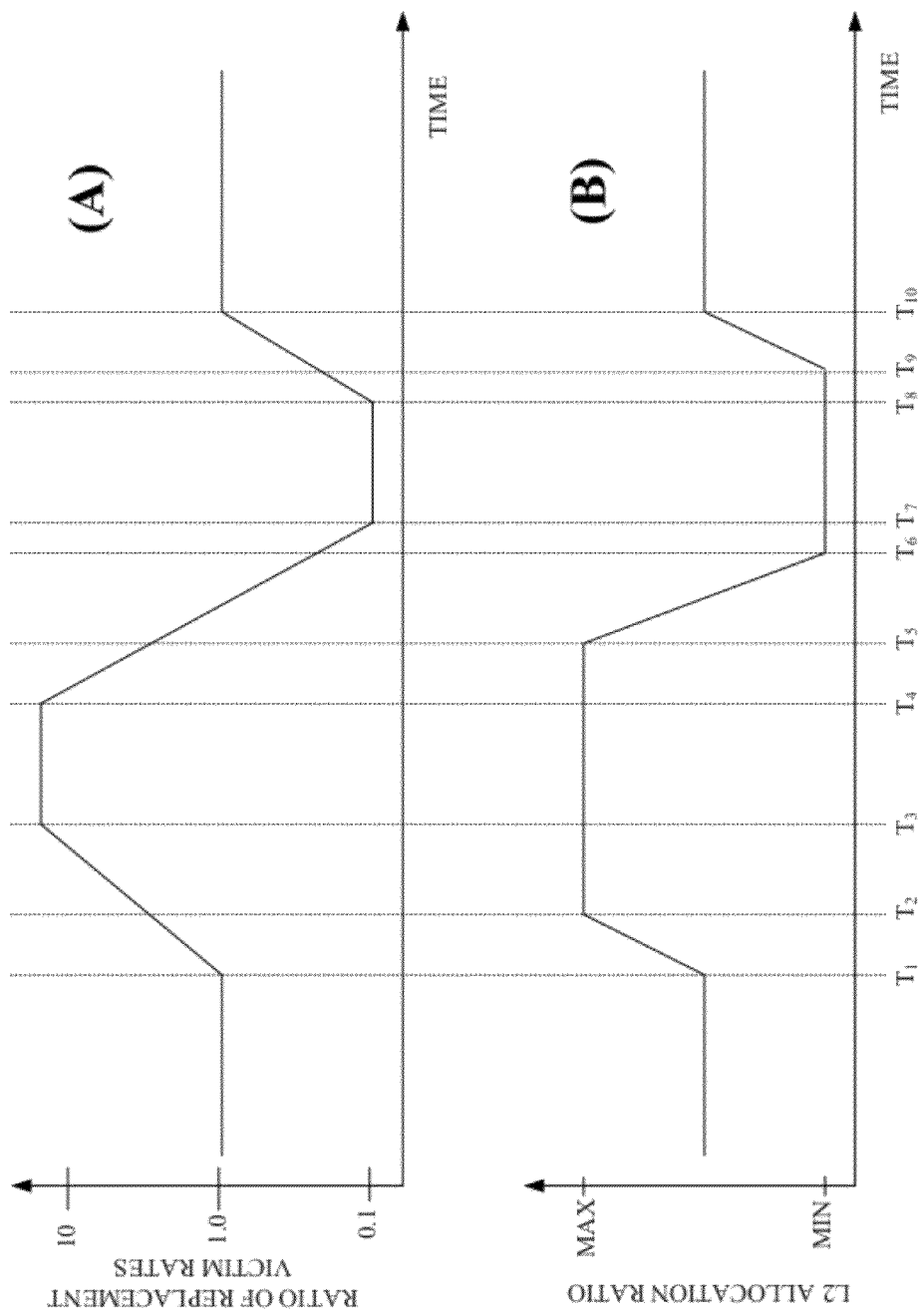
FIGS. 4A and 4B illustrate dynamic allocation of instruction-only and data only portions of one exemplary embodiment of a unified cache memory.

FIGS. 4A and 4B illustrates dynamic allocation of instruction-only and data only portions of one exemplary embodiment of a unified cache memory. The horizontal axes for FIGS. 4A and 4B indicate increasing time (in arbitrary units) from left to right. The vertical axis of FIG. 4A indicates the ratio of replacement victim rates for instruction lines and data lines on a logarithmic scale that ranges over two orders of magnitude from approximately 0.1 to 10. The ratios can be determined by an allocation controller using measurements performed by the allocation controller or information provided to the allocation controller by another device. Alternatively, the ratios can be provided to the allocation controller by one or more of the devices. The vertical axis of FIG. 4B indicates the ratio of instruction-only lines/ways to data-only lines/ways allocated to the unified L2 cache. In the illustrated embodiment, the allocation ratio is bounded by a minimum value (MIN) and a maximum value (MAX) that are defined so that at least some of the lines/ways are allocated for instruction-only and data-only allocation regardless of the value of the ratio of the replacement victim rates. The values of MIN/MAX are a matter of design choice.

The allocation controller, such as the allocation controller 135 depicted in FIG. 1, can dynamically alter or modify the allocation of instruction-only and data-only lines/ways based on the ratio of replacement victim rates. However, persons of ordinary skill in the art having benefit of the present disclosure should appreciate that other parameters can be used instead of (or in combination with) the replacement victim rates to determine the dynamic allocation of the lines/ways of the unified L2 cache. Furthermore, although FIGS. 4A and 4B depict the various ratios as varying substantially continuously, in alternative embodiments the values of these ratios may be measured, determined, and/or modified at any interval or rate. For example, the ratios can be determined and the allocations varied once per second, minute, hour, or day.

FIGS. 4A and 4B include vertical dotted lines corresponding to instances in time indicated by the symbols $T_{1-10}$. The allocation of the instruction-only and data-only lines/ways varies within these time intervals as follows.

$T<T_1$: The ratio of the replacement victim rates for instructions and data is approximately 1 and approximately equal portions of the unified L2 cache are allocated to instruction-only and data-only lines/ways.

$T_1<T<T_2$: The replacement victim rate for instructions is rising relative to the replacement victim rate for data. The allocation controller therefore increases the allocation of instruction-only lines/ways relative to the allocation of the data-only lines/ways, thereby increasing the allocation ratio in this interval.

$T_2<T<T_3$: The replacement victim rate for instructions continues rising relative to the replacement victim rates for data. However, the allocated ratio of instruction-only lines/ways to data-only lines/ways has reached the MAX value and so the allocation controller does not continue to increase this ratio.

$T_3<T<T_4$: The ratio of the replacement victim rates plateaus and remains constant, as does the allocation ratio.

$T_4<T<_5$: The ratio of the replacement victim rates begins to fall but remains high enough that the allocation ratio remains at the MAX value.

$T_5<T<T_6$: The ratio of the replacement victim rates continues to fall and so the allocation controller reduces the allocation ratio in response to the decreasing ratio of the replacement victim rates.

$T_6<T<T_7$: The ratio of the replacement victim rates continues to fall but the allocation ratio reaches and remains at the MIN value and so the allocation controller does not continue to decrease this ratio.

$T_7<T<T_8$: The ratio of the replacement victim rates plateaus at approximately 0.1 and the allocation ratio remains at the MIN value.

$T_8<T<T_9$: The ratio of the replacement victim rates begins to rise but remains low enough that the allocation ratio remains at the MIN value.

$T_9<T<T_{10}$: The ratio of the replacement victim rates continues to rise and the allocation controller begins to increase the allocation ratio in response to the rising ratio of the replacement victim rates.

$T>T_{10}$: The ratio of the replacement victim rates for instructions and data is approximately 1 and approximately equal portions of the unified L2 cache are allocated to instruction-only and data-only lines/ways.

Allocation controllers can also implement other forms of dynamic allocation instead of (or in combination with) the exemplary dynamic allocation technique depicted in FIGS. 4A and 4B. In one embodiment, the allocation of instruction-only lines and data-only lines in a unified cache can be varied based upon the activity status of the device that implements the unified cache. For example, in the case of a mobile device implementing the unified cache, the allocation controller can determine or be informed that the mobile device has gone to sleep. The mobile device will likely wake up in response to a system interrupt signal and so it is expected that as much as 99% of the cache requests made by the waking mobile device may be for instructions and as little as 1% may be for data. The unified cache may therefore be partitioned so that as much as 99% of the lines/ways are allocated to instruction-only information and the remaining lines/ways are allocated to data-only information.

Figure 5:
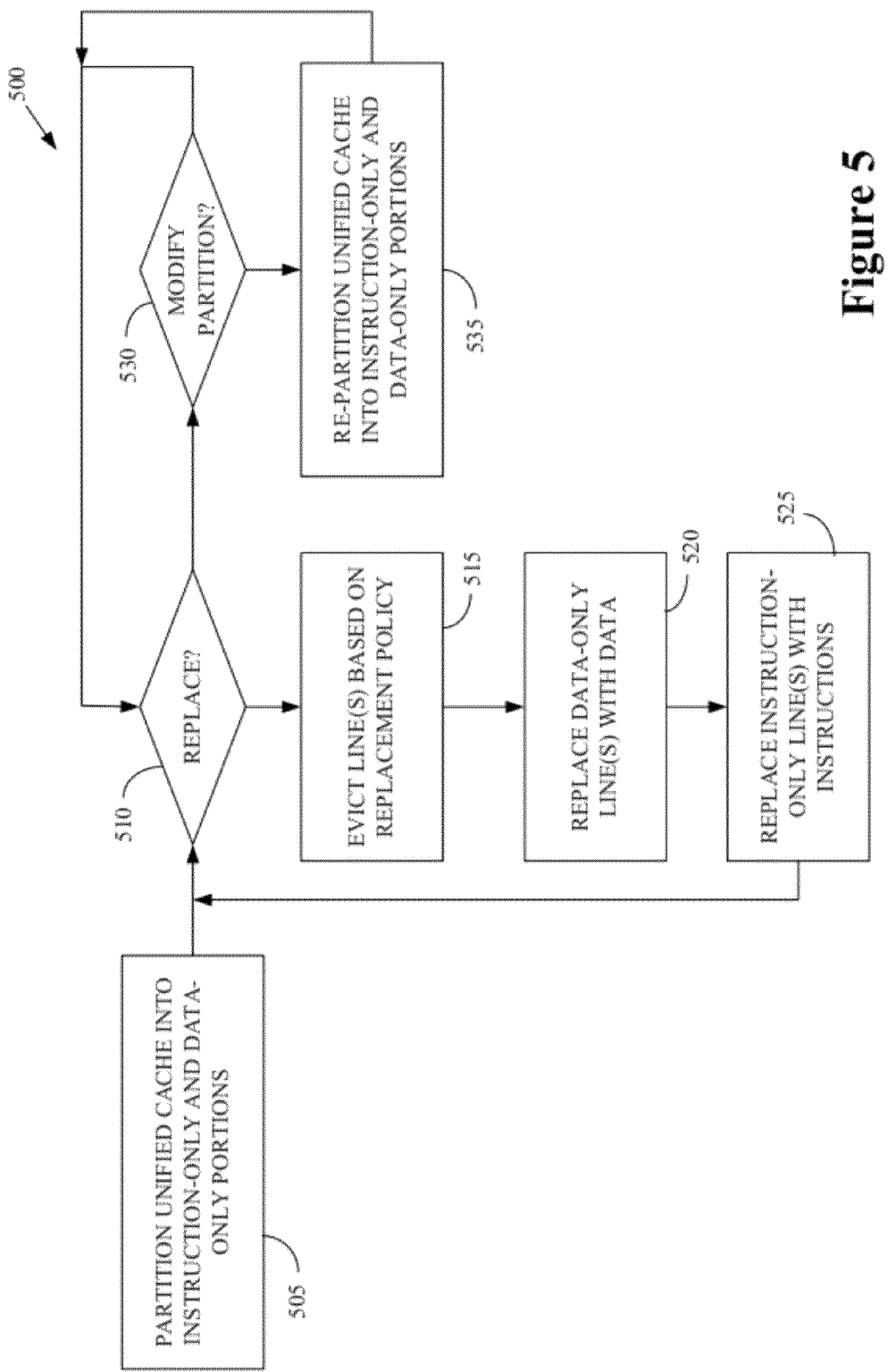
FIG. 5 conceptually illustrates one exemplary embodiment of a method of operating an allocation controller.

FIG. 5 conceptually illustrates one exemplary embodiment of a method 500 of operating an allocation controller such as the allocation controller 135 shown in FIG. 1. In the illustrated embodiment, the allocation controller partitions (at 505) the unified cache into instruction-only portions and data-only portions. For example, one set of lines in the unified cache can be dedicated to storing instructions and a second set of lines in the unified cache can be dedicated to storing data. The allocation controller can then monitor the cache to determine (at 510) whether to replace one or more lines in the cache. If the allocation controller determines (at 510) that one or more lines are to be replaced, e.g., using a replacement policy for the cache, then the selected lines are evicted (at 515). The allocation controller then replaces the lines in accordance with the partitioning of the unified cache. Data-only lines are therefore replaced (at 520) with data and instruction-only lines are replaced (at 525) with instructions.

The allocation controller can also determine (at 530) whether the partitioning of the unified cache should be modified. For example, the allocation controller can determine (at 530) that the partition should be modified in response to changing conditions such as changing relative demands for instructions and data. If the allocation controller determines (at 530) that the partition of the unified cache be modified, then the allocation controller re-partitions (at 535) the unified cache. For example, the allocation controller could increase or decrease the relative proportion (or absolute number) of instruction-only lines. The allocation controller could also increase or decrease the relative proportion (or absolute number) of data-only lines.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation. Additionally, hardware aspects or embodiments of the invention could be described in source code stored on a computer readable media. In such an embodiment, hardware embodiments could be described by a hardware description language (HDL) such as Verilog or the like. This source code could then be synthesized and further processed to generate an intermediate representation (e.g., GDSII) data which is also stored on a computer readable media. Such source code is then used to configure a manufacturing process (e.g., a semiconductor fabrication facility or factory) through, for example, the generation of lithography masks based on the source code (e.g., the GDSII data). The configuration of the manufacturing process then results in a semiconductor device embodying aspects of the present invention.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    partitioning a unified cache into a first portion of lines that only store copies of instructions retrieved from a memory, a second portion of lines that only store copies of data retrieved from the memory, a third portion of lines that store copies of either data or instructions retrieved from the memory; and
    modifying the partition of the unified cache in response to changes in a ratio of a replacement rate for instruction lines and a replacement rate for data lines in the unified cache and further in response to a current activity status of a device that implements the unified cache, the current activity status indicating whether the device is in a sleep mode.

2. The method of claim 1, wherein partitioning the unified cache comprises defining a replacement policy so that the first portion of lines are replaced only with instructions retrieved from the memory and the second portion of lines are replaced only with data retrieved from the memory.

3. The method of claim 1 further comprising repartitioning the unified cache into a fourth portion of lines that only store copies of instructions retrieved from memory and a fifth portion of lines that only store copies of data retrieved from the memory, the fourth portion differing in size from the first portion and the fifth portion differing in size from the second portion.

4. The method of claim 1, wherein the unified cache is N-way associative to the memory and wherein partitioning the unified cache comprises allocating a first portion of the ways to store copies of instructions, a second portion of the ways to store copies of the data, and a third portion of the ways to store copies of either instructions or data.

5. The method of claim 1, wherein partitioning the unified cache comprises partitioning the unified cache based on expected relative demands for instructions and data for a device that implements the unified cache.

6. The method of claim 1, wherein modifying the partition of the unified cache comprises modifying a ratio of a number of instruction lines to a number of data lines in the unified cache in response to changes in the ratio of the replacement rate for instruction lines and the replacement rate for data lines in the unified cache.

7. An apparatus, comprising:
    an instruction cache configured to store copies of instructions from a memory;
    a data cache configured to store copies of data from the memory; and
    a unified cache that is communicatively coupled to the instruction cache and the data cache, the unified cache being configured to be partitioned into a first portion of lines that only store copies of instructions retrieved from the memory, a second portion of lines that only store copies of data retrieved from the memory, and a third portion of lines that stores copies of instructions or data retrieved from the memory, wherein the partition of the unified cache is modifiable in response to changes in a ratio of a replacement rate for instruction lines and a replacement rate for data lines in the unified cache and in response to a current activity status of a device that implements the unified cache, the current activity status indicating whether the device is in a sleep mode.

8. The apparatus of claim 7, comprising an allocation controller that is configurable to implement a replacement policy that dictates that the first portion of lines are replaced only with instructions retrieved from the memory and the second portion of lines are replaced only with data retrieved from the memory.

9. The apparatus of claim 8, wherein the allocation controller is configured to cause at least one of the lines in the first portion to be replaced with a new instruction in response to an old instruction being evicted from said at least one of the lines in the first portion.

10. The apparatus of claim 7, comprising an allocation controller configured to determine the partitioning of the unified cache.

11. The apparatus of claim 10, wherein the unified cache is implemented in at least one of a server, a general-purpose desktop, a notebook, a netbook, a mobile device, or an embedded system and wherein the allocation controller is configured to partition the unified cache based on expected relative demands for instructions and data for the server, the general-purpose desktop, the notebook, the netbook, the mobile device, or the embedded system.

12. The apparatus of claim 10, wherein the allocation controller is configured to modify a ratio of a number of instruction lines to a number of data lines in the unified cache in response to changes in the ratio of the replacement rate for instruction lines and the replacement for data lines in the unified cache.

13. A semiconductor device, comprising:
    a processing element;
    an instruction cache configured to store copies of instructions from a memory;
    a data cache configured to store copies of data from the memory; and
    a unified cache that is communicatively coupled to the instruction cache and the data cache, the unified cache configured to be partitioned into a first portion of lines that only store copies of instructions retrieved from the memory, a second portion of lines that only store copies of data retrieved from the memory, and a third portion of lines that store copies of data or instructions retrieved from the memory, wherein the partition of the unified cache is modifiable in response to changes in a ratio of a replacement rate for instruction lines and a replacement rate for data lines in the unified cache and in response to a current activity status of the processing element, the current activity status indicating whether the processing element is in a sleep mode.

14. The semiconductor device of claim 13, comprising an allocation controller configured to partition the unified cache into the first portion and the second portion based on an estimated relative number of requests from the processing element for instructions and data.

15. A non-transitory computer readable media storing instructions that when executed can configure a manufacturing process used to manufacture a semiconductor device comprising:
- a processing element;
- an instruction cache configured to store copies of instructions from a memory;
- a data cache configured to store copies of data from the memory; and
- a unified cache that is communicatively coupled to the instruction cache and the data cache, the unified cache configured to be partitioned into a first portion of lines that only store copies of instructions retrieved from the memory, a second portion of lines that only store copies of data retrieved from the memory, and a third portion of lines that store copies of data or instructions retrieved from the memory, wherein the partition of the unified cache is modifiable in response to changes in a ratio of a replacement rate for instruction lines and a replacement rate for data lines in the unified cache and in response to a current activity status of the processing element, the current activity status indicating whether the processing element is in a sleep mode.

16. The non-transitory computer readable media set forth in claim 15, wherein the computer readable media is configured to store at least one of hardware description language instructions or an intermediate representation.

17. The non-transitory computer readable media set forth in claim 15, wherein the instructions when executed configure generation of lithography masks.

* * * * *